(12) United States Patent
Campbell et al.

(10) Patent No.: US 11,556,475 B2
(45) Date of Patent: Jan. 17, 2023

(54) POWER OPTIMIZED PREFETCHING IN SET-ASSOCIATIVE TRANSLATION LOOKASIDE BUFFER STRUCTURE

(71) Applicant: International Business Machines Corporation, Armonk, NY (US)

(72) Inventors: David Campbell, Austin, TX (US); George W. Rohrbaugh, III, Charlotte, VT (US); Jake Truelove, Austin, TX (US); Jon K. Kriegel, Rochester, MN (US); Charles D. Wait, Byron, MN (US); Jody Joyner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 17/215,287

(22) Filed: Mar. 29, 2021

(65) Prior Publication Data
US 2022/0309000 A1  Sep. 29, 2022

(51) Int. Cl.
*G06F 12/0862* (2016.01)
*G06F 12/02* (2006.01)
*G06F 12/1045* (2016.01)
*G06F 12/0864* (2016.01)

(52) U.S. Cl.
CPC ...... *G06F 12/0862* (2013.01); *G06F 12/0238* (2013.01); *G06F 12/0864* (2013.01); *G06F 12/1054* (2013.01)

(58) Field of Classification Search
CPC ............ G06F 12/0238; G06F 12/0862; G06F 12/0864; G06F 12/1054
See application file for complete search history.

(56) References Cited

U.S. PATENT DOCUMENTS

| | | |
|---|---|---|
| 5,963,984 A | 10/1999 | Garibay, Jr. et al. |
| 7,793,070 B2 | 9/2010 | Stecher |
| 8,924,651 B2 | 12/2014 | Tang et al. |
| 9,081,706 B2 | 7/2015 | Koka et al. |
| 9,460,022 B2 | 10/2016 | Venkatasubramanian et al. |
| 9,501,425 B2 | 11/2016 | Mukherjee et al. |
| 10,296,465 B2 | 5/2019 | John et al. |

(Continued)

FOREIGN PATENT DOCUMENTS

EP  3343353 A1  7/2018

OTHER PUBLICATIONS

Anonymous "High Performance and Low Power First Line Defense for Instruction Translation" IP.com, IPCOM000257688D, Mar. 2, 2019 (2 pages).

(Continued)

*Primary Examiner* — Aracelis Ruiz
(74) *Attorney, Agent, or Firm* — Cantor Colburn LLP; Brian Restauro

(57) ABSTRACT

A computer system includes a processor and a prefetch engine. The processor is configured to generate a demand access stream. The prefetch engine is configured to initiate a first prefetch request based on the demand access stream and perform a first prefetch that includes performing a translation lookaside buffer (TLB) lookup on a TLB structure in response to the first prefetch request. The processor determines a TLB entry in response to performing the TLB lookup and performs at least one second prefetch based on the TLB entry without performing a subsequent TLB lookup on the TLB structure.

14 Claims, 5 Drawing Sheets

(56) References Cited

U.S. PATENT DOCUMENTS

| | | | |
|---|---|---|---|
| 10,409,608 | B2 | 9/2019 | Morbach et al. |
| 2006/0259735 | A1 | 11/2006 | Anand et al. |
| 2010/0268892 | A1* | 10/2010 | Luttrell .............. G06F 12/0862 711/E12.001 |
| 2011/0072235 | A1 | 3/2011 | Deming et al. |
| 2014/0149362 | A1* | 5/2014 | Kearns ............... G06F 16/2365 707/691 |
| 2015/0339233 | A1* | 11/2015 | Kapil .................. G06F 12/10 711/137 |
| 2017/0286304 | A1* | 10/2017 | Peled .................. G06F 12/0862 |
| 2018/0095892 | A1 | 4/2018 | Wilkinson et al. |
| 2018/0150406 | A1 | 5/2018 | John et al. |
| 2018/0203807 | A1 | 7/2018 | Krueger |
| 2018/0246815 | A1 | 8/2018 | Smith et al. |
| 2019/0205263 | A1 | 7/2019 | Fleming et al. |
| 2020/0133881 | A1 | 4/2020 | Campbell et al. |
| 2021/0089468 | A1* | 3/2021 | Hao .................... G06F 9/30047 |

OTHER PUBLICATIONS

Anonymous "Method and Apparatus for Handling Self Modifying Code in Dynamic Binary Translated Simulators" IP.com, IPCOM000245170D, Feb. 16, 2016 (7 pages).

Anonymous "Unified Translation Lookaside Buffer for Host/Guest Translation Results in a Nested Translation Environment" IP.com, IPCOM000249321D, Feb. 16, 2017 (2 pages).

Campbell et al., "Translation Bandwidth Optimized Prefetching Strategy Through Multiple Translation Lookaside Buffers", U.S. Appl. No. 17/215,296, filed Mar. 29, 2021.

IBM, "List of IBM Patent Applications Treated As Related", Appendix P, Dated Mar. 30, 2021, 2 pages.

Kandiraju et al., "Going the distance for TLB prefetching: An application-driven study" Proceedings 29th Annual International Symposium on Computer Architecture, IEEE (May 2002) pp. 195-206.

Lustig et al., "TLB improvements for chip multiprocessors: Inter-core cooperative prefetchers and shared last-level TLBs" ACM Transactions on Architecture and Code Optimization (TACO) vol. V, No. N, Article A, (Jan. 2013) pp. 1-30.

Saulsbury et al., "Recency-based TLB preloading" Proceedings of the 27th annual international symposium on Computer architecture (May 2000) pp. 117-127.

Srikantaiah et al., "Synergistic TLBs for high performance address translation in chip multiprocessors" 2010 43rd Annual IEEE/ACM International Symposium on Microarchitecture. IEEE, (Dec. 2010) pp. 313-314.

* cited by examiner

POWER OPTIMIZED PREFETCHING IN SET-ASSOCIATIVE TRANSLATION LOOKASIDE BUFFER STRUCTURE

BACKGROUND

Embodiments of the present invention relate in general to computing processing systems, and in particular, computer processing associated with cache prefetching.

Computing processing systems that employ virtualized environments utilize one or more translation lookaside buffers (TLBs) that cache translations (i.e., mappings of virtual-to-physical addresses) for converting virtual addresses into the physical addresses that indicate the actual location of the requested data in the main memory. The translations stored in the TLBs are typically limited to recent mappings of virtual-physical addresses. By storing recent mappings of virtual-physical addresses in the faster TLBs, the time at which page-table access is reduced thereby improving processor performance.

To further boost execution performance, computing processing systems can employ a technique referred to as "cache prefetching." Cache prefetching utilizes a prefetch engine (commonly referred to as a "prefetcher") to monitor demand accesses generated by system programs, predict the memory requests (e.g., data stored in the main memory) of the program based on the demand accesses, and fetch the memory requests before it is actually needed by the program. In a virtualized environment, the prefetch engine also utilizes the TLBs to increase the speed at which to translate the virtual addresses of the prefetched memory requests into their corresponding physical addresses (also referred to as real addresses).

SUMMARY

According to a non-limiting embodiment, a computer-implemented method is provided for performing prefetching in a computer processing system. The method comprises generating, by a processor, a demand access stream, and initiating, via a prefetch engine, a first prefetch request based on the demand access stream and performing a first prefetch that includes performing a translation lookaside buffer (TLB) lookup on a TLB structure in response to the first prefetch request. The method further comprises determining a TLB entry in response to performing the TLB lookup; and performing at least one second prefetch based on the TLB entry without performing a subsequent TLB lookup on the TLB structure.

According to another non-limiting embodiment, a computer system includes a processor and a prefetch engine. The processor is configured to generate a demand access stream. The prefetch engine is configured to initiate a first prefetch request based on the demand access stream and perform a first prefetch that includes performing a translation lookaside buffer (TLB) lookup on a TLB structure in response to the first prefetch request. The processor determines a TLB entry in response to performing the TLB lookup and performs at least one second prefetch based on the TLB entry without performing a subsequent TLB lookup on the TLB structure.

According to yet another non-limiting, a computer program product is provided to control a computer processing system to perform prefetching. The computer program product comprises a computer readable storage medium having program instructions embodied therewith. The program instructions are executable by an electronic computer processor to control the computer processing system to perform operations comprising generating a demand access stream, and initiating a first prefetch request based on the demand access stream and performing a first prefetch that includes performing a translation lookaside buffer (TLB) lookup on a TLB structure in response to the first prefetch request. The operations further comprises determining a TLB entry in response to performing the TLB lookup; and performing at least one second prefetch based on the TLB entry without performing a subsequent TLB lookup on the TLB structure.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
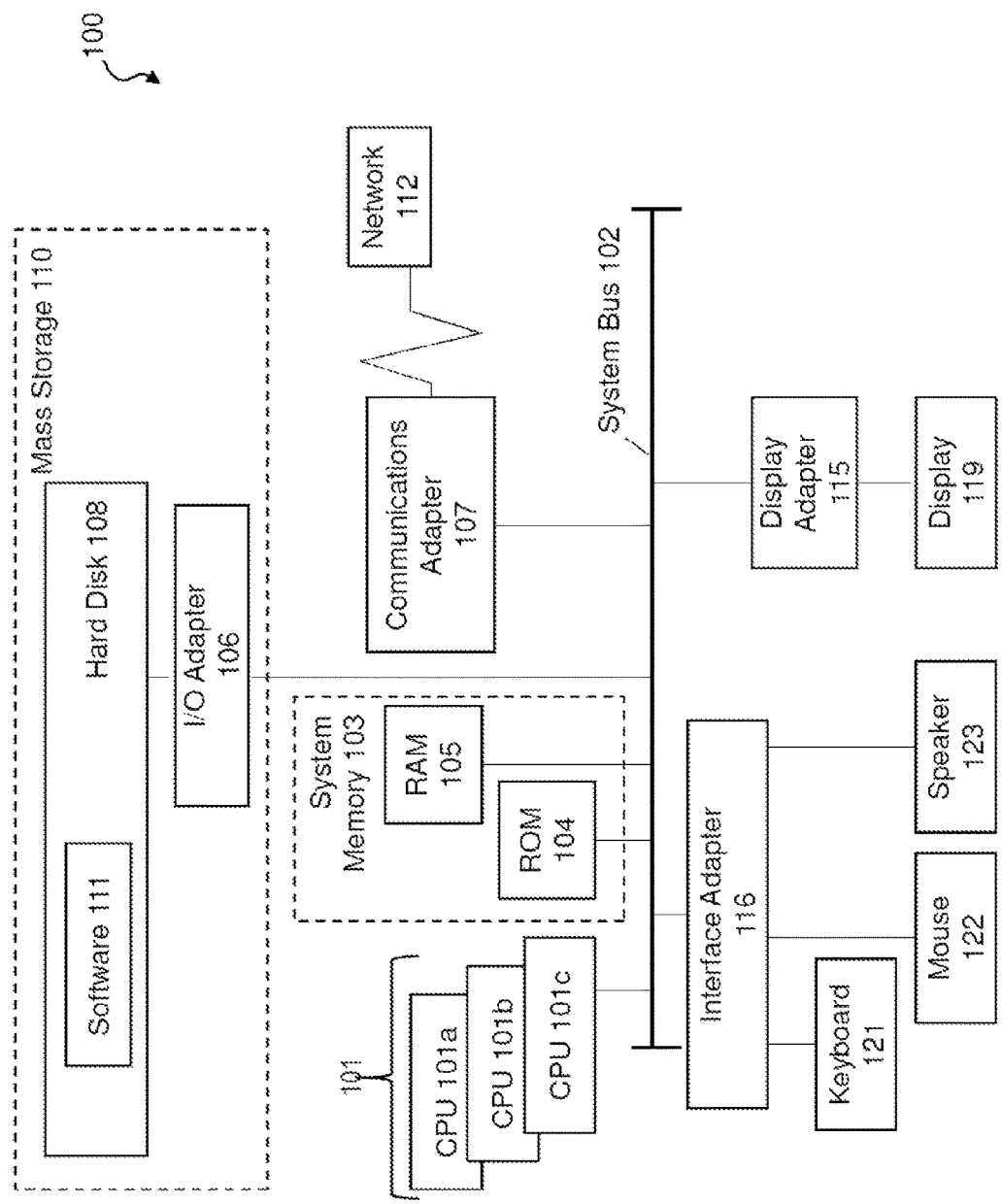
FIG. 1 depicts a block diagram of a computer system for implementing some or all aspects of one or more non-limiting embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

As described above, computing processing systems that employ virtualized environment utilize TLBs to store recent virtual-to-physical mappings (i.e., "translations"). The TLBs can be utilized (e.g., by a prefetch engine) when performing a TLB lookup to translate virtual addresses of prefetched memory requests into their corresponding physical addresses. If a given TLB contains the virtual address of a memory request, a "TLB hit" is determined, and the corresponding physical address is determined and the data stored at the physical address is obtained from the main memory. If the virtual address is not in a given TLB, a "TLB miss" is determined, and system proceeds to a lower-level TLB in search of the virtual address.

Some computing processing system implement a collection of TLBs or sets of TLBs, with each set containing cache lines or "TLB entries". When the TLB includes multiple TLB sets, the TLB can be referred as an "N-way" set associative TLB structure (where "N" is the number of TLB sets). Thus, a "set" value can serve as an index to a given TLB directory in the TLB structure, where there can be "N" number of ways that realize a "tag compare" when performing a TLB lookup.

The "N" locations in each set of an N-way set associative TLB structure are typically referred to as "ways." A unique "way" value can be assigned to each given "way" to identify which specific "way" realized a match with a given virtual address when performing a TLB lookup. Accordingly, implementing "N" number of "ways" effectively arranges the N-way set associative TLB structure as a two-dimensional array with "N" columns, which allows for increasing the chance for TLB hits and reduces the rate of TLB misses.

In general, as the number "N" of "ways" in an N-way set associative structure increases the power consumption in the computer processing system increases. Accordingly, some computer processing systems split the TLB structure into two individual structures: a TLB way directory (typically referred to simply as a "TLB directory") and a TLB payload. This split TLB structure saves power because only the virtual address bits of the TLB structure are accessed in parallel as opposed to accessing both the virtual address and the physical address.

When a TLB hit occurs in the TLB directory, the corresponding TLB entry of the TLB directory is determined. The TLB entry can be defined according to a set/way format (i.e., "set, way") and can be used as an index value or "pointer" that indexes to the TLB payload which contains the real address associated with the data of the memory request. Unlike the TLB directory, however, the TLB payload is not set associative but is instead directly indexed with the "set, way" value that is determined following a TLB hit in the TLB directory. As a result, a prefetch engine employed in a conventional N-way set associative TLB structure must look up every component defined by the TLB structure, which contributes to the computing system's power consumption. The prefetch engine, however, will often perform prefetches on the same system page as its previous (e.g., most recent) prefetch. Consequently, a prefetch engine employed in a conventional computing processing system may repeatedly access the same TLB directory when performing multiple prefetches to the same page, thereby duplicating work when looking up a wide TLB directory.

According to one or more non-limiting embodiments, a computer processing system is provided that includes a prefetch engine configured to determine the previous payload accessed during the most recent prefetch. Rather than expend processing power to repeat reading the same TLB directory used in the previous prefetch, the prefetch engine bypasses reading the TLB directory and directly reads the TLB payload accessed in the previous prefetch request to determine the physical address for the current ongoing prefetch request. In one or more embodiments, the TLB directory can be repeatedly bypassed so that the TLB payload is directly accessed repeatedly when performing sequential prefetches thereby conserving processing power.

FIG. 1 illustrates a computer system 100 configured to implement some or all aspects of one or more non-limiting embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS), which controls certain basic functions of the computer system 100. The RAM 105 is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
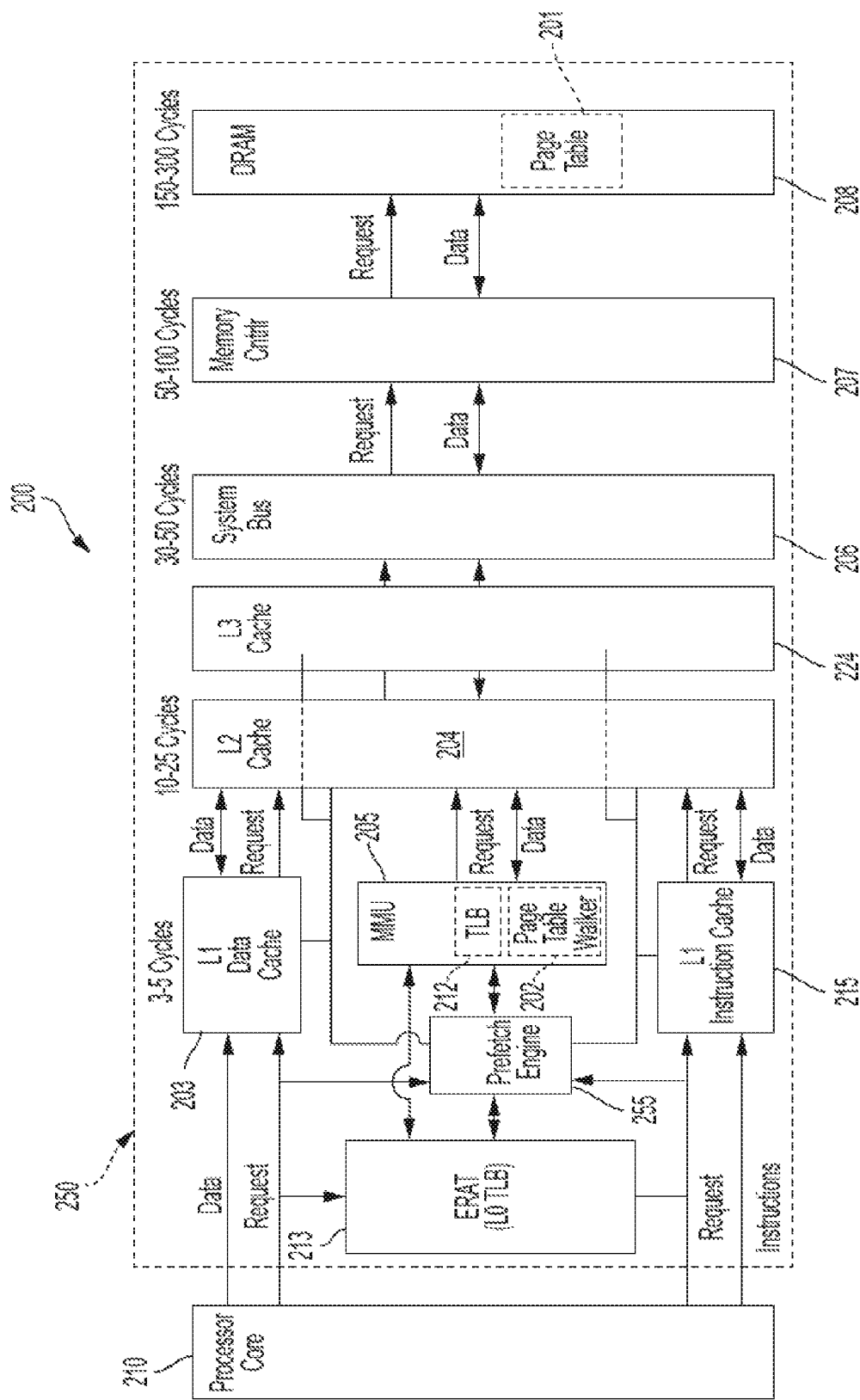
FIG. 2 depicts a block diagram of a computer processing system configured to perform power-optimized prefetching with an N-way set associative TLB structure according to non-limiting embodiments.

Turning now to FIG. 2, a computer processing system 200 configured to perform cache prefetching according is illustrated according to non-limiting embodiments of the invention. The computer processing system 200 includes a processor 210 in signal communication with a memory system 250. The processor 210 can be constructed as a central processing unit (CPU) configured to execute an operating system (OS).

The memory system 250 includes several levels of data caches (e.g., L1 data cache 203, L2 data cache 204 and L3 data cache 224), a memory management unit (MMU) 205, a system bus 206, a memory controller 207, main memory (DRAM) 208, an ERAT 213, and a prefetch engine 255. The data caches 203, 204 and 223 are relatively smaller than the main memory 208, but run faster than the main memory 208. In a non-limiting embodiment, the data caches 203, 204 and 224 are designed according to a cache hierarchy. For example, the L1 data cache 203 is considered a larger-sized higher-level cache compared to the L2 data cache 204 and the L3 data cache 224, and the L2 cache 204 is considered a larger-sized higher-level cache compared to the L3 data cache 224. In addition, the L1 data cache 203 is considered a faster cache compared to the L2 data cache 204 and the L3 data cache 224, and the L2 data cache 204 is considered a faster cache compared to the L3 data cache 224. As described herein, the prefetch engine 255 can monitor a demand access stream including one or more demand access requests generated by the processor 210 and issue one or more prefetch requests such that data can be loaded from the larger, slower main memory 208 to the relatively smaller, faster data caches 224, 204 and 203 in order to make it more readily available to the processor 210 when needed. In one or more embodiments, the prefetch engine 255 can process several streams of prefetch requests simultaneously.

The MMU 205 includes one or more translation lookaside buffers (TLBs) 212, and a page table walker 202. The MMU 205 executes a selected paging algorithm to determine and maintain the current mappings from virtual addresses (VAs) to RAs using one or more page tables (PTs) 201. When an address is received from an execution unit in the processor 210, the MMU 205 will translate a VA to an RA using the page tables 201. In one or more non-limiting embodiments, the page tables 201 can be located in the main memory (e.g., DRAM 208) and the page table walker 202 can be invoked to access the page tables 201, and provide appropriate translation. It should be appreciated that the location of the page table walker 202 is not limited to the MMU 205 can be located elsewhere such as the memory controller 207, for example, without departing from the scope of the invention.

When the processor 210 executes memory access instructions (e.g. load, store) while operating in the virtual mode, it presents an EA to the L1 data cache 203. The MMU 205 converts the EA into the corresponding RA, which is required for accessing the data (including in some systems, an intermediate VA).

The ERAT 213 can serve as a highest-level TLB (e.g., L0 TLB) and caches a limited number of previous ERATs in anticipation of their reuse. Although the ERAT 213 is shown as being external from the MMU 205, it should be appreciated that the ERAT 213 can be located elsewhere such as integrated in the MMU 205, for example, without departing from the scope of the invention. If the required translation is found in the ERAT 213, the process within the MMU 205 can be bypassed. A similar process occurs when the processor 210 fetches new instructions for execution. Once the RA is determined, it may be used to validate an entry found in the L1 instruction cache 215 or if no match is found in the L1 cache 215, the RA is presented to the L2 cache 204. In cases where there is also no match found in the L2 204 cache, the RA is propagated to the memory subsystem (e.g., lower level caches) to access the required data.

A unique address translation is required for each memory page. As an example, a page may contain 4 kilobytes (KB), 64 kilobytes, or other larger amounts of DRAM 208 storage. The TLBs 212 can be designed as content addressable memory (CAM) and can contain an entry for each of the most recently required translation. Requests for entries can be loaded in a buffer or "mailbox" before they are submitted to a given TLB 212, which processes one request per cycle. Occasionally, an address will be presented to the MMU 205 that does not have a matching translation in the TLBs 212.

When this happens, a TLB miss is declared and the page table walker 202 is activated to search the complete PT 201 stored in DRAM 208.

The page table walker 202 typically includes a hash function to facilitate one or more memory accesses and processing of individual page table entries (PTEs) in the resulting data to locate the required PTE. In one or more embodiments, the page walks performed by the page table walker 202 can be tree traversals. Once the page table walker 202 has retrieved the required PTE, this new PTE is used to complete the required address translation, and the pending memory access process continues as with normal accesses. The new PTE displaces another PTE within a respective TLB 212, based on time since last use. A last recently used (LRU) mechanism similar to that used in caches determines which previous TLB entry to displace.

The prefetch engine 255 is in signal communication with the processor 210, the ERAT 213 and the MMU 205. The prefetch engine 255 is configured to monitor the demand access requests sent from the processor 210 and output prefetch demands to the MMU 205 indicating EAs for page lines it desires to prefetch. In one or more non-limiting embodiments, the prefetch engine 255 can generate a stream of highly-speculative leading prefetch requests (e.g., an L3 prefetch request), which can then be passed to the data caches 203, 204 and 224 according to the cache hierarchy. Thus, in contrast to demand accesses (e.g., demand load requests), the leading prefetch requests (as well as other prefetch requests) are not generated in response to execution of an instruction set architecture (ISA) instruction by the instruction execution circuitry of the processor 210, but are rather generated by the prefetch engine 255 in anticipation of execution of one or more ISA instructions that implicitly or explicitly indicate a memory access. Although the leading prefetch requests accesses each data cache 203, 204, 224 of the cache hierarchy, it is generally the case that the target memory blocks of leading prefetch requests do not initially reside in the cache memory hierarchy and or obtained from the main memory 208 and passed up the cache hierarchy.

Subsequent to a leading prefetch request and nearer in time to an anticipated demand memory access request (e.g., demand load or store request), the prefetch engine 255 can issue a corresponding trailing prefetch request (e.g., an L1 prefetch request) targeting the same target memory block. The trailing prefetch requests are typically much less speculative than the leading prefetch requests. Although trailing prefetch requests also access each data cache 203, 204, 224 of the cache hierarchy it is generally the case that the target memory block of a trailing prefetch request initially resides only in L3 data cache 224 as a result of the earlier corresponding leading prefetch request. Accordingly, the L3 data cache 224 generally services a trailing prefetch request by supplying the target memory block of the trailing prefetch request to one or more higher levels of cache memory as prefetch data.

When a demand load misses the L1 cache, it allocates a Load Miss Queue entry and attempts translation via the ERAT (e.g., L0 TLB). When operating in the virtual mode, the ERAT 213 returns the real address of the miss and performs security checks. After all checks are passed, the ERAT 213 allows the demand miss to be sent out of the processor 210 and the Load Miss Queue is updated accordingly. In the real mode, however, the miss will wait until it is the next to complete (NTC) instruction before the ERAT 213 services the load. As described herein, no translation is performed when operating in the real mode, but the ERAT 213 will still ensure that the load is safe before it is sent out of the processor 210 and the Load Miss Queue is updated accordingly.

In addition, when operating in the virtual mode a Prefetch Request Queue (PRQ) included in the prefetch engine 255 can allocate a new prefetch stream at any point, including when a load miss occurs. In the real mode, however, the PRQ in the prefetch engine 255 is only allowed to allocate after an LMQ entry has been allocated and has been allowed to send its miss request out of the processor 210 (i.e. after passing strict address checks performed by the ERAT 213) to ensure that the prefetches that follow the load are safe.

In some instances, the control logic of the prefetch engine 255 may initiate an L3 cache prefetch operation in response, for example, to a demand load during instruction processing (e.g., monitoring the demand access generated by the processor 210). The L3 data cache 224 is a larger cache compared to the L1 data cache 203, but runs slower than the L1 data cache 203. Accordingly, L3 prefetches will be sent prior to L1 prefetches and in enough time for the data to be loaded from the main memory 208 into the L3 data cache 224 so that the prefetch data loaded in the L3 data cache 224 can be passed to the L1 data cache 203.

Figure 3:
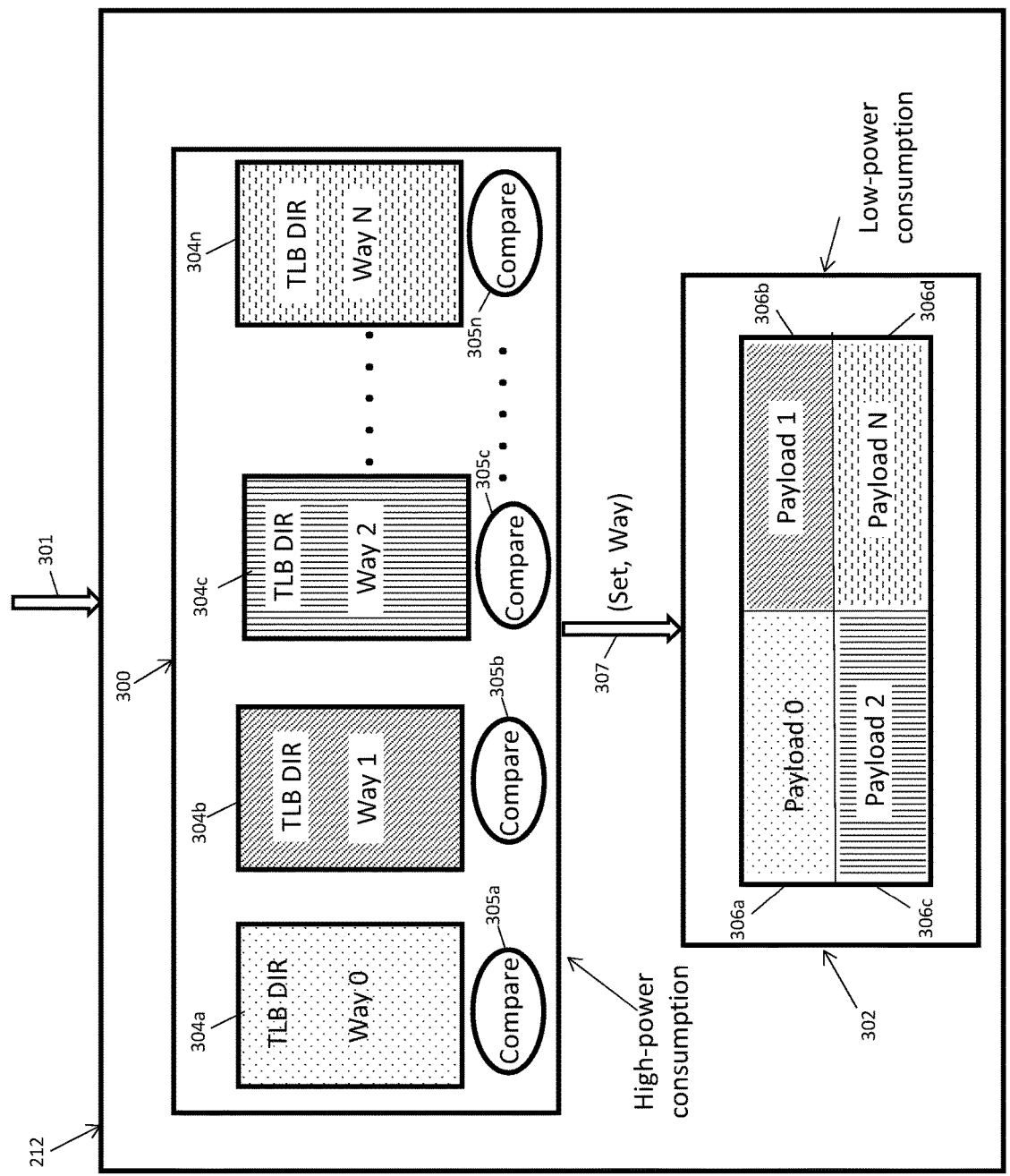
FIG. 3 is a block diagram of an N-way set associative TLB structure according to a non-limiting embodiment.

With reference now to FIG. 3, a TLB 212 of the computing processing system 200 is illustrated according to a non-limiting embodiment. The TLB 212 is designed according to an N-way set associative TLB structure, which includes a TLB directory block 300 and a TLB payload block 302. The TLB 212 receives demand access requests 301 (e.g., generated by the processor 210), which include virtual addresses to be translated into physical addresses using the TLB directory block 300 and a TLB payload block 302 as described in greater detail below.

The TLB directory block 300 includes "N" TLB directories 304a, 304b, 304c . . . 304n (collectively referred to as 304a-304n). The entries stored in each TLB directory 304a-304n are organized according to a page granularity. For example, each TLB directory 304a-304n is sized at 4 kilobytes (4K), compared to a cache line granularity which is less, e.g., 128 bytes. Thus, each 4K TLB directory 304a-304n stores 32 cache lines (e.g., 32 TLB entries). The cache lines indicate a given set and way (set, way) and can be used as a "pointer" that indexes to the TLB payload block 302. It should be appreciated that the page granularity of the TLB directories 304a-304n can be greater without departing from the scope of the invention.

The TLB payload block 302 includes "N" TLB payloads 306a, 306b, 306c . . . 306n (collectively referred to as 306a-306n). Each TLB payload 306a-306n contains a list of physical addresses included in the main memory 208 that store the actual data sought in a demand access request or prefetch request. When performing a demand access request or prefetch request, comparison operations 305a, 305b, 305c . . . 305n (collectively referred to as 305a-305n) are performed at the TLB directory block 300 to determine the location of target cache lines associated with a numbered set and a numbered way (set, way). For example, a given compare operation 305a-305n compares a virtualized address with the tags of the TLB entries stored in a respective TLB directory 304a-304n that is currently being "looked-up".

A match between the virtualized address and a stored tag/TLB entry indicates a specific matching "set, way" 307 of a respective TLB directory 304a-304n. Once the "set, way" 307 is determined, the corresponding TLB payload 306a-306n can be determined and accessed to read the physical address associated with the ongoing request. For example, a comparison match indicating a "set, way" associated with TLB directory 304b can be used as a pointer to TLB payload 306b. Accordingly, TLB payload 306b is then accessed to obtain the physical address corresponding to the demand access or prefetch request.

Figure 4:
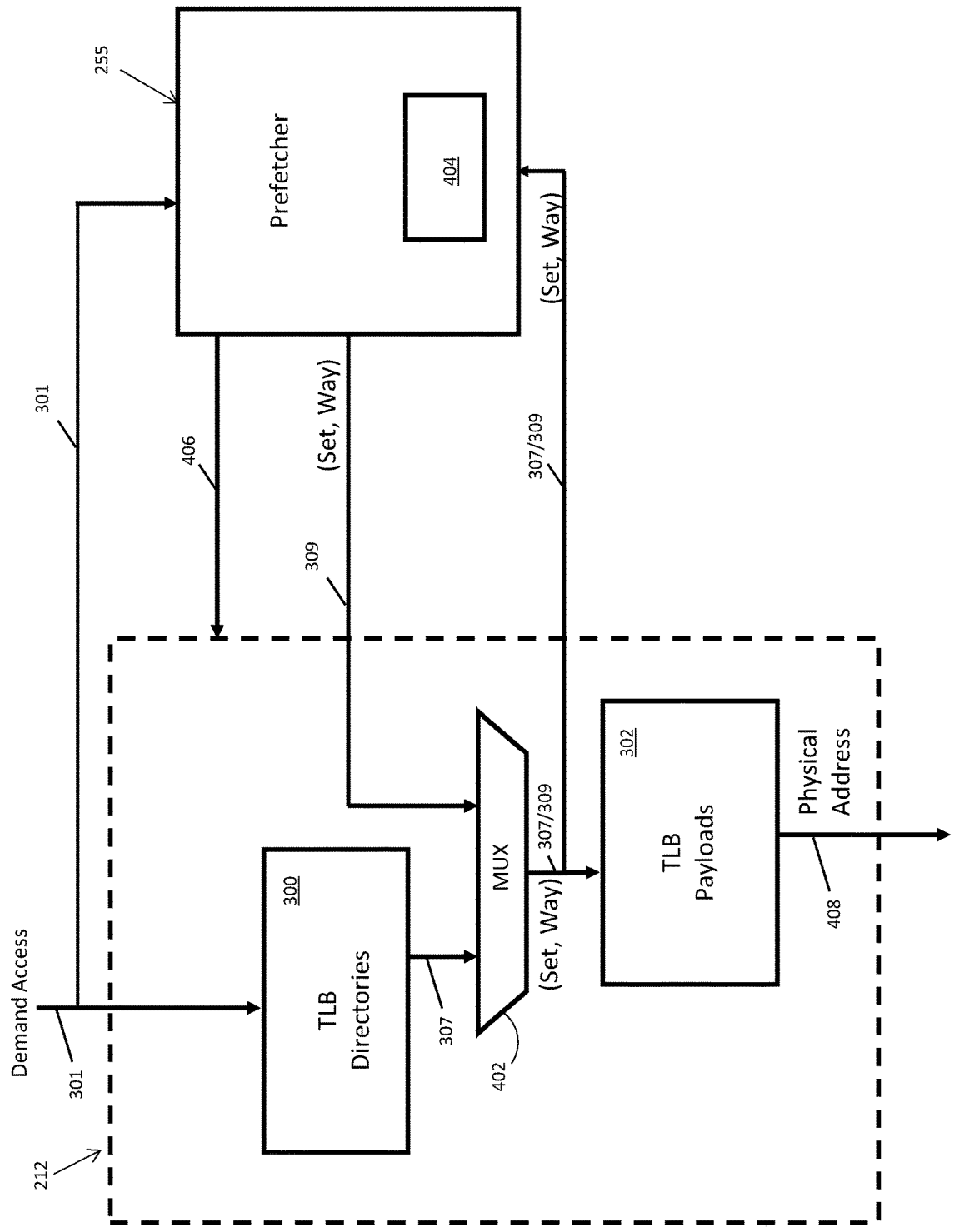
FIG. 4 is a block diagram of a prefetch engine in signal communication with an N-way set associative TLB structure according to a non-limiting embodiment.

Referring now to FIG. 4, a prefetch engine 255 is shown in signal communication with a TLB 212. As described herein, the TLB 212 is implemented as an N-way set associative TLB structure that includes a TLB directory block 300 and a TLB payload block 302. The TLB 212 receives demand access requests 400 (e.g., generated by the processor 210) including virtual addresses, which are also received and monitored by the prefetch engine 255. When a TLB directory lookup is called, compare operations will be performed on the TLB directories included in the TLB directory block 300 to obtain the "set, way" value 307 that point to a given TLB payload included in the TLB payload block 302 that stores the physical address corresponding to the virtual address.

The TLB 212 further includes a multiplexer (MUX) 402 configured to receive the "set, way" 307 output from the TLB directory block 300 and stored "set, way" data 309 associated with a memory unit 404 included with the prefetch engine 255. Although the memory unit 404 is shown as being implemented in the prefetch engine 255, the location of the memory unit 404 is not limited thereto and can be located externally from the prefetch engine 255.

The output from the MUX 402 is controlled in part by a TLB lookup bypass signal 406 output from the prefetch engine 255. For example, based on the bit (e.g., "0" or "1") of the TLB lookup bypass signal 406, the output from the MUX 402 can be either the location of a most recent hit TLB entry as indicated by the "set, way" value 307 output from the TLB block 300 or a stored "set, way" data 309 obtained from the memory unit 404. In this manner, the operation of the MUX 402 and the TLB lookup bypass signal 406 allows the TLB 212 to selectively operate in either a first mode (e.g., a TLB directory lookup mode" or a second mode (e.g., a TLB directory lookup bypass mode).

When the TLB lookup bypass signal 406 is set to "OFF" (e.g., a "0" bit signal is generated), for example, the first mode (e.g., a TLB directory lookup mode) is invoked causing the TLB 212 to perform a TLB directory lookup as described herein and to output the resulting "set, way" 307 to the MUX 402. Accordingly, the TLB 212 disregards the stored "set, way" data 309 and outputs the "set, way" 307 from the MUX 402 to the TLB payload 302 to obtain the physical address 408 and complete the translation. In one or more non-limiting embodiments, the prefetch engine 255 can detect when it has crossed a page boundary or can predict that a page boundary will be crossed on the next cycle. Either example can be viewed as a page boundary cross event. In response to detecting the page boundary cross event, the prefetch engine 255 can set the TLB lookup bypass signal 406 to "OFF", which in turn results in a full TLB directory lookup when performing the next prefetch request.

The output signal from the MUX 402 indicates the location of the hit TLB entry and is fedback to the prefetch engine 255. This feedback of the hit TLB entry allows the prefetch engine 255 to learn the location of the TLB entry, i.e., the set, way 307. Accordingly, the prefetch engine 255 can avoid the need to repeat the TLB directory lookup on future access to the same TLB entry, thereby conserving power. In this manner, the prefetch engine 255 can identify subsequent prefetches to the same page and can use the same TLB entry learned from the prior prefetch (i.e., as indicated by the "set, way" 307) given the prefetch does not cross a page boundary. Based on the prior prefetch, the prefetch engine 255 can store the "set, way" 307 from the hit resulting from the most recent TLB directory lookup and store it in a memory unit 404 (e.g., one or more latches/flipflops) as stored "set, way" data 309.

On one or more of the following prefetches in the page, the prefetch engine 255 can set the TLB lookup bypass signal 406 to "ON" (e.g., a "1" bit signal is generated). Accordingly, the second mode (i.e., the TLB directory lookup bypass mode) of the TLB 212 is invoked such that the TLB 212 bypasses the TLB directory lookup operation and performs the translation using the stored "set, way" data 309. That is, the TLB 212 halts performing another TLB directory lookup, and instead outputs the stored "set, way" 309 from the MUX 402 to the TLB payload 302 to obtain the physical address 408 and complete the translation. In this manner, the translation is performed using less computing power thereby improving the performance and efficiency of the computing system 200. As described herein, the prefetch engine 255 can set the TLB lookup bypass signal 406 to "OFF" in response to detecting a page boundary cross event. Accordingly, a full TLB directory lookup when performing the next prefetch request.

In one or more embodiments, the prefetch engine 255 continuously processes prefetch requests back-to-back by directly accessing the TLB payloads 306a-306n using the stored "set, way" data 309 without having to repeatedly perform a TLB lookup in the TLB directories 304a-304n. The back-to-back prefetches can be viewed as a "burst mode" and can be continued until the TLB lookup bypass signal 406 is switched "OFF." When the prefetch engine 255 is operating in the burst mode, it is possible that the "set, way" of the TLB entry it was working on could have been evicted or invalidated. Accordingly, one or more non-limiting embodiments provide a set/way validity table to ensure the stored "set, way" used when bypassing the TLB directory lookup remains valid.

Figure 5:
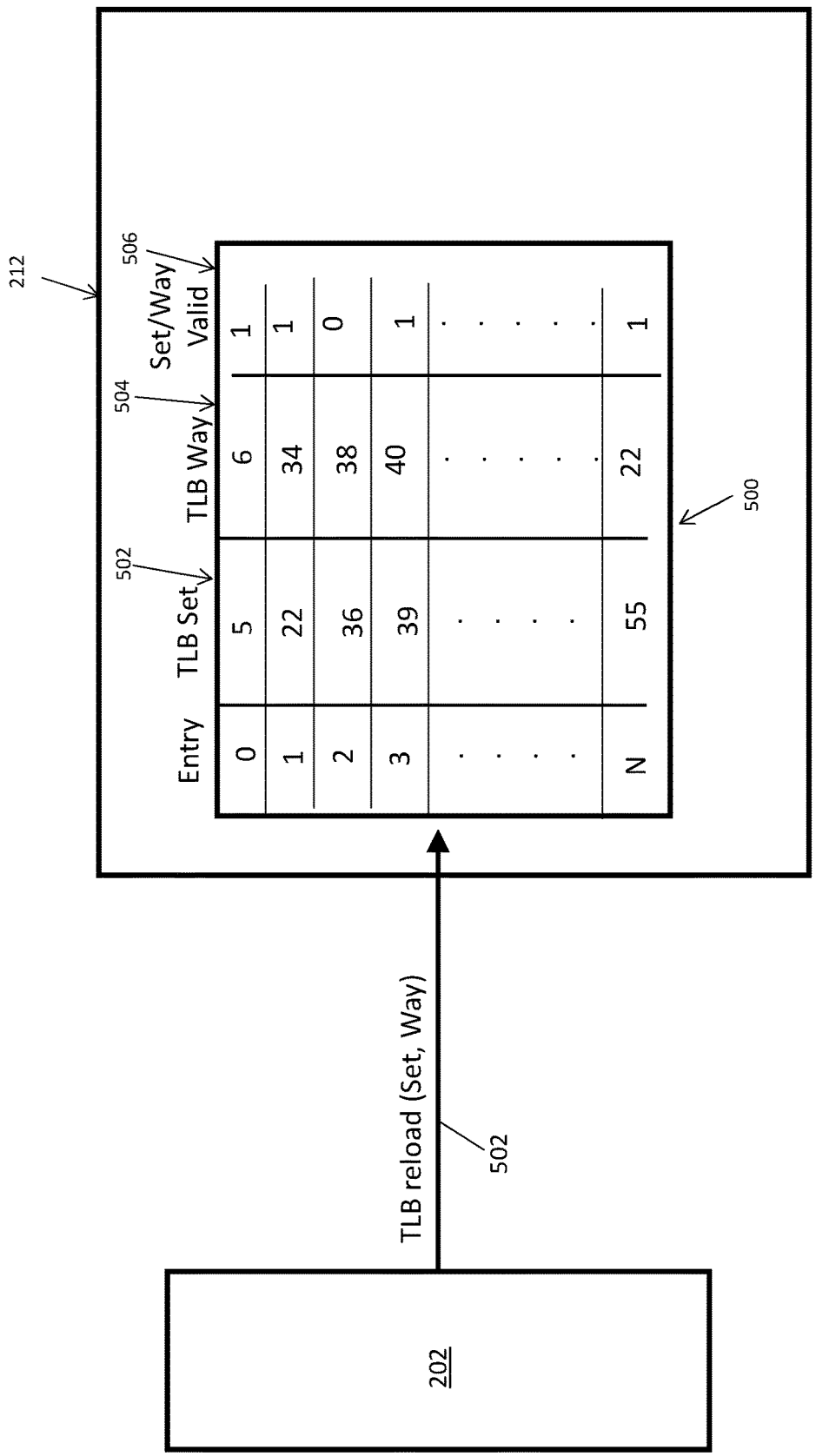
FIG. 5 depicts a set/way validity table used by the prefetch engine to determine the validity of a TLB entry according to a non-limiting embodiment.

Turning to FIG. 5, a set/way validity table 500 is illustrated according to a non-limiting embodiment. The TLB 212 is in signal communication with a page table walker 202 and is configured to access the data stored in the set/way validity table 500. The set/way validity table 500 stores a set/way bits 506 corresponding to set, way values 502,504. For example, the set/way validity table 500 stores a valid bit 506 set to "1" associated with new set, way values 502,504 that are determined following a prefetch operation, and stores an invalid bit 506 set to "0" associated with set, way values 502,504 that are determined to be invalid. Although the set/way validity table 500 is shown implemented in the TLB 212, it should be appreciated that the location of the set/way validity table 500 can be stored elsewhere in the system 200 without departing from the scope of the present invention.

The page table walker 202 actively monitors the TLB directories 304a-304n and generates a TLB reload signal 502. The TLB reload signal 502 provides information pertaining to the current TLB entries of the TLB directories 304a-340n, including information indicating a changed TLB entry (e.g., an evicted TLB directory entry) in a given TLB directory 304a-304n as identified by respective "set, way" values. For example, the TLB reload signal 502 can indicate an evicted TLB entry associated with a corresponding "set, way" 502, 504.

When the evicted "set, way" 502,504 indicated by the TLB reload signal 502 matches a stored "set, way" 502,504 indicated as "valid" (i.e., a valid bit 506 set to "1") in the set/way validity table 500, the TLB 212 can clear the valid bit 506 in the set/way validity table 500 (e.g., sets the valid bit 506 to "0") and invoke one or more recovery actions. The recovery actions can include, for example, dropping any pending prefetches associated with the stored "set, way" that has now been cleared (i.e., set to "0") in the set/way validity table 500. In one or more non-limiting embodiments, in response to detecting the cleared valid bit 506 (e.g., bit="0"), the prefetch engine 255 can perform additional recovery actions including, but not limited to, re-invoking the TLB directory lookup mode to perform a full TLB directory lookup and rediscover a valid "set, way" that can be used to bypass the TLB directory lookup on subsequent prefetches as described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for performing prefetching in a computer processing system, the method comprising:
    generating, by a processor, a demand access stream;
    initiating, via a prefetch engine, a first prefetch request based on the demand access stream and performing a first prefetch that includes performing a translation lookaside buffer (TLB) lookup on an N-way set associative TLB structure in response to the first prefetch request;
    determining a TLB entry in response to performing the TLB lookup; and
    performing at least one second prefetch based on the TLB entry without performing a subsequent TLB lookup on the TLB structure,
    where performing the first prefetch comprises:
        performing the TLB lookup on a plurality of TLB directories included in the N-way set associative TLB structure;
        determining an index value (set, way) based on the TLB entry obtained from a given TLB directory among the TLB directories;
        accessing a given TLB payload among a plurality of TLB payloads included in the N-way set associative TLB structure based on the index value (set, way); and
        reading from the given TLB payload a physical address corresponding to the index value (set, way).

2. The computer-implemented method of claim 1, wherein the at least one second prefetch is performed immediately following the first prefetch.

3. The computer-implemented method of claim 1, wherein the at least one second prefetch includes a plurality of subsequent prefetches performed repeatedly without performing the subsequent TLB lookup on the plurality of TLB directories.

4. The computer-implemented method of claim 1, wherein performing the at least one second prefetch without performing the subsequent TLB lookup on the TLB structure comprises:
    storing, in a memory unit, the index value (set, way) data determined in response to performing the TLB lookup;
    generating, via the prefetch engine, a first TLB lookup bypass signal that halts performing a subsequent TLB lookup after performing the TLB lookup in response to the first prefetch request; and
    accessing the given TLB payload based on the stored index value (set, way) data.

5. The computer-implemented method of claim 4, further comprising:
    detecting, via the prefetch engine, a page boundary cross event;
    generating, via the prefetch engine, a second TLB lookup bypass signal that invokes performing the subsequent TLB lookup after performing the at least one second prefetch;

determining new index value (set, way) data in response to performing the subsequent TLB lookup associated with a subsequent prefetch request;

accessing the given TLB payload included in the N-way set associative TLB structure based on the new (set, way) data; and reading from the TLB payload block a physical address corresponding to the new index value (set, way).

6. The computer-implemented method of claim 5, further comprising:

storing each index value (set, way) data corresponding to a respective prefetch request;

monitoring the plurality of TLB directories and generating a TLB reload signal indicating a change in the TLB entry corresponding to current index value (set, way) data included in the given TLB directory;

comparing the current index value (set, way) data with the stored index value set, way); and performing at least one recovery action in response to determining the current index value (set, way) matches the stored index value (set, way).

7. A computer system comprising:

a processor configured to generate a demand access stream; and a prefetch engine configured to initiate a first prefetch request based on the demand access stream and perform a first prefetch that includes performing a translation lookaside buffer (TLB) lookup on an N-way set associative TLB structure in response to the first prefetch request, wherein the processor determines a TLB entry in response to performing the TLB lookup and performs at least one second prefetch based on the TLB entry without performing a subsequent TLB lookup on the TLB structure, wherein the processor is further configured to perform the TLB lookup on a plurality of TLB directories included in the N-way set associative TLB structure, determine an index value (set, way) based on the TLB entry obtained from a given TLB directory among the TLB directories, access a given TLB payload among a plurality of TLB payloads included in the N-way set associative TLB structure based on the index value (set, way), and read from the given TLB payload a physical address corresponding to the index value (set, way).

8. The computer system of claim 7, wherein the at least one second prefetch is performed immediately following the first prefetch.

9. The computer system of claim 7, wherein the at least one second prefetch includes a plurality of subsequent prefetches performed repeatedly without performing the subsequent TLB lookup on the plurality of TLB directories.

10. The computer system of claim 7, further comprising:

a memory unit configured to store the index value (set, way) data determined in response to performing the TLB lookup, wherein the prefetch engine generates a first TLB lookup bypass signal that halts performing a subsequent TLB lookup after performing the TLB lookup in response to the first prefetch request, and wherein the processor access the given TLB payload based on the stored index value (set, way) data.

11. The computer system of claim 10, wherein the prefetch engine is configured to detect a page boundary cross event, to generate a second TLB lookup bypass signal that invokes performing the subsequent TLB lookup after performing the at least one second prefetch, to determine new index value (set, way) data in response to performing the subsequent TLB lookup associated with a subsequent prefetch request, to access the given TLB payload included in the N-way set associative TLB structure based on the new (set, way) data, and to read from the TLB payload block a physical address corresponding to the new index value (set, way).

12. The computer system of claim 11, further comprising a page table walker configured to wherein the memory unit is configured to store each index value (set, way) data corresponding to a respective prefetch request, wherein the page table walker is configured to monitor the plurality of TLB directories, and to generate a TLB reload signal indicating a change in the TLB entry corresponding to current index value (set, way) data included in the given TLB directory, and wherein the prefetch engine is configured to compare the current index value (set, way) data with the stored index value set, way), and perform at least one recovery action in response to determining the current index value (set, way) matches the stored index value (set, way).

13. A computer program product to control a computer processing system to perform prefetching, the computer program product comprising a computer readable storage medium having program instructions embodied therewith, the program instructions executable by an electronic computer processor to control the computer processing system to perform operations comprising:

generating a demand access stream;

initiating a first prefetch request based on the demand access stream and performing a first prefetch that includes performing a translation lookaside buffer (TLB) lookup on an N-way set associative TLB structure in response to the first prefetch request;

determining a TLB entry in response to performing the TLB lookup; and performing at least one second prefetch based on the TLB entry without performing a subsequent TLB lookup on the TLB structure, where performing the first prefetch comprises:

performing the TLB lookup on a plurality of TLB directories included in the N-way set associative TLB structure;

determining an index value (set, way) based on the TLB entry obtained from a given TLB directory among the TLB directories;

accessing a given TLB payload among a plurality of TLB payloads included in the N-way set associative TLB structure based on the index value (set, way); and reading from the given TLB payload a physical address corresponding to the index value (set, way).

14. The computer program product of claim 13, wherein the at least one second prefetch is performed immediately following the first prefetch, and wherein the at least one second prefetch includes a plurality of subsequent prefetches performed repeatedly without performing the subsequent TLB lookup on the plurality of TLB directories.

* * * * *